(12) United States Patent
Lee et al.

(10) Patent No.: US 10,394,208 B2
(45) Date of Patent: Aug. 27, 2019

(54) SERVER APPARATUS IN ENERGY MANAGEMENT SYSTEM AND OPERATING METHOD OF THEREOF

(71) Applicant: LSIS CO., LTD., Anyang-si, Gyeonggi-do (KR)

(72) Inventors: Seok-Chan Lee, Anyang-si (KR); Jong-Kab Kwak, Anyang-si (KR); Sung-Ho Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 284 days.

(21) Appl. No.: 15/398,064

(22) Filed: Jan. 4, 2017

(65) Prior Publication Data
US 2017/0255175 A1 Sep. 7, 2017

(30) Foreign Application Priority Data
Mar. 4, 2016 (KR) ........................ 10-2016-0026408

(51) Int. Cl.
*G06F 9/46* (2006.01)
*G05B 19/042* (2006.01)
*G06F 9/50* (2006.01)

(52) U.S. Cl.
CPC ......... *G05B 19/042* (2013.01); *G06F 9/5083* (2013.01); *G05B 2219/2639* (2013.01)

(58) Field of Classification Search
None
See application file for complete search history.

(56) References Cited

U.S. PATENT DOCUMENTS

| 5,784,616 A * | 7/1998 | Horvitz | G06F 9/4881 718/100 |
| 2007/0198977 A1* | 8/2007 | Abernethy, Jr. | G06Q 10/06 718/100 |

(Continued)

FOREIGN PATENT DOCUMENTS

| JP | 2007-174512 A | 7/2007 |
| KR | 10-2008-0016276 A | 2/2008 |

(Continued)

OTHER PUBLICATIONS

European Search Report dated Jul. 17, 2017 issued in corresponding European Application No. 16193065.6.

*Primary Examiner* — Kenneth Tang
(74) *Attorney, Agent, or Firm* — K&L Gates LLP (57) ABSTRACT

The present invention relates to an energy management system. The energy management system includes: a client device; and a server. The server includes: a communication unit configured to communicate with the client device; a processor configured to perform a process requested by the client device; a storage unit in which data related to control and management of the energy management system; and a controller configured to control the processor to classify a plurality of tasks included in a first process according to a predetermined criterion, create a plurality of second processes from the first process, and process the plurality of second processes by referring to the data. If a load is weighted on a second process performing a predetermined task, the controller is further configured to control the processor to additionally create another second process performing the predetermined task.

8 Claims, 7 Drawing Sheets

(56) References Cited

U.S. PATENT DOCUMENTS

| | | |
|---|---|---|
| 2008/0109814 A1 | 5/2008 | Park |
| 2010/0269110 A1 | 10/2010 | Leijen et al. |
| 2013/0125133 A1 | 5/2013 | Schuster |
| 2016/0188373 A1* | 6/2016 | Tameshige ................ G06F 9/50 718/103 |
| 2018/0074974 A1* | 3/2018 | Borlick ................ G06F 12/128 |

FOREIGN PATENT DOCUMENTS

| | | |
|---|---|---|
| KR | 10-2012-0044694 A | 5/2012 |
| KR | 10-2015-0108167 A | 9/2015 |

* cited by examiner

SERVER APPARATUS IN ENERGY MANAGEMENT SYSTEM AND OPERATING METHOD OF THEREOF

CROSS REFERENCE TO RELATED APPLICATION

This application claims the benefit of Korean Patent Application No. 10-2016-0026408, filed on Mar. 4, 2016, entitled "SERVER APPARATUS IN ENERGY MANAGEMENT SYSTEM AND OPERATING METHOD OF THEREOF", which is hereby incorporated by reference in its entirety into this application.

BACKGROUND

1. Technical Field

The present invention relates to a server in an energy management and a method of operating the server and more particularly, to a server which is capable of alleviating a service delay due to a load by improving a method of processing a process requested by a client, and a method of operating the server.

2. Description of the Related Art

A power system has become more and more complex with consistent increase in its scale and introduction of new equipment. Accordingly, many efforts have been made to provide the optimal operation of the power system. The optimal operation of the power system means the system operation to maximize the economic feasibility while maintaining the reliability of supply of power at a certain level or higher.

An energy management system (EMS) is utilized for the optimal operation of the power system. The energy management system is a system having a function of monitoring and controlling the state of a power system based on data collected through a remote supervisory control and data acquisition (SCADA) or the like.

Figure 1:
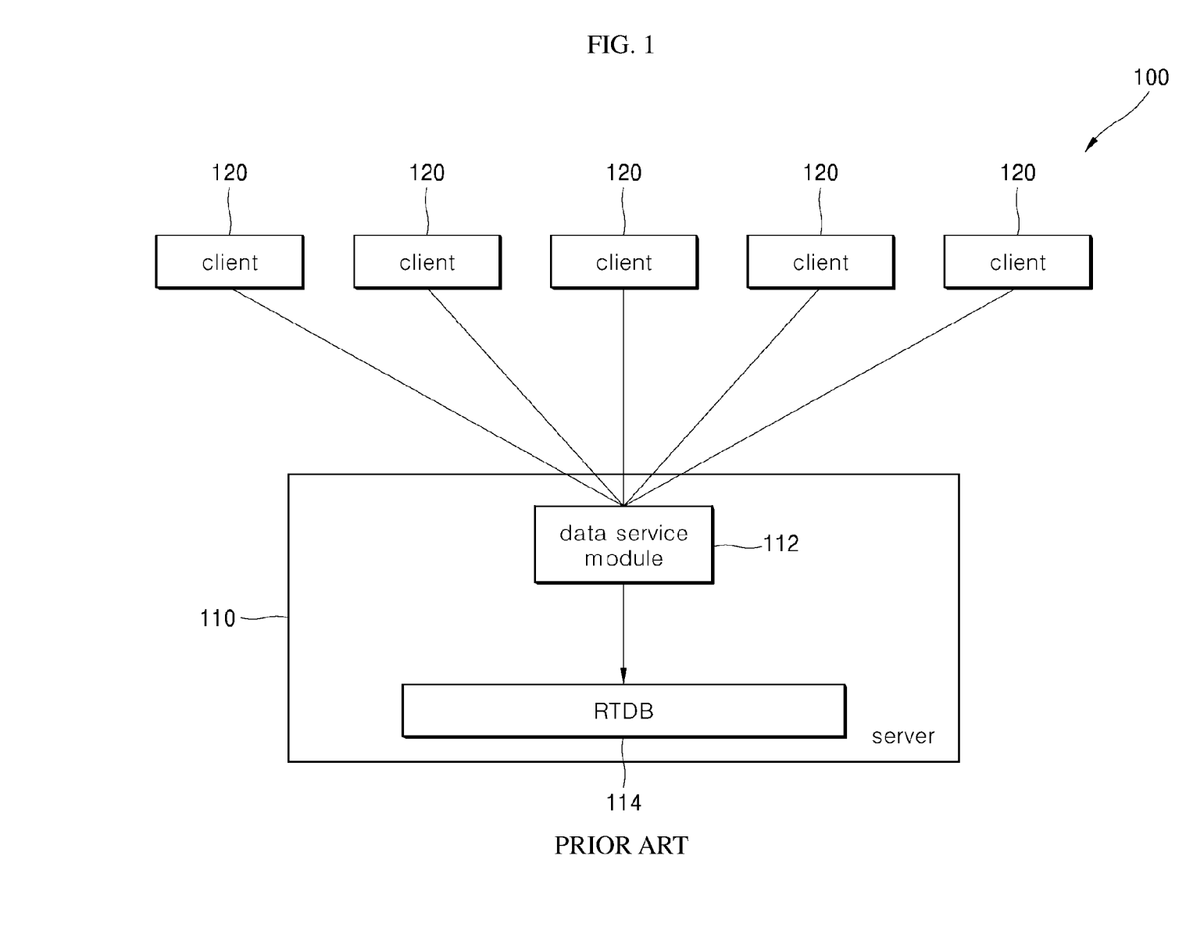
FIG. 1 is a diagram used to explain a process performed in a typical energy management system.

FIG. 1 is a diagram used to explain a process performed in a typical energy management system.

Referring to FIG. 1, an energy management system 100 is configured to include a sever 110 which receives and processes data, and one or more clients 120, each of which has a screen on which data are displayed. The data displayed on the screen of each client 120 are received from the server 110 through a data service module 112 incorporated in the server 110.

In this way, the energy management system 100 uses the data service module 112 to transfer instructions and a data service between the server 110 and each client 120. In this case, each client 120 accesses the data service module 112 in the server 110 to receive the data service.

When executing the screen, the client 120 requests the data service module 112 of the server 110 to send data required for the screen to the client 120, receives the data from the data service module 112, and displays the data on the screen. In addition, instructions such as value designation, tag setting and so on, are sent to the server 110 of the energy management system 100 or field equipment in a power plant or the like.

The data service module 112 requested to send the data retrieves a real-time database (RTDB) 114 to search the data, processes the searched data according to the request, and transmits the processed data to the client 120. In addition, the data service module 112 requested to send the instructions checks whether or not the instructions are valid. If so, the data service module 112 processes the valid instructions and transmits the processed instructions to the client 120.

Since the data service module 112 of the current energy management system 100 processes the request from the client 120 alone, a load thereof increases with increase in the number of clients 112. In addition, if the load increases over a certain level, both of a data service with an overload and a data service with a light load may become as a whole. This may result in a limitation in the number of clients 120 which can access the server 110. In addition, since one data service module 112 processes all the data, only one CPU is used. Therefore, even when hardware equipment is added to the system, this has little effect on improvement of the performance of data processing.

SUMMARY

It is an aspect of the present invention to provide a server which is capable of improving a structure of a data service module so that a service delay due to a load can be prevented.

The present invention is not limited to the above aspect and other aspects of the present invention will be clearly understood by those skilled in the art from the following description.

In accordance with one aspect of the present invention, there is provided an energy management system including: a client device; and a server including: a communication unit configured to communicate with the client device; a processor configured to perform a process requested by the client device; a storage unit in which data related to control and management of the energy management system; and a controller configured to control the processor to classify a plurality of tasks included in a first process according to a predetermined criterion, create a plurality of second processes from the first process, and process the plurality of second processes by referring to the data.

In accordance with another aspect of the present invention, there is provided a method of operating a server in an energy management system, including: receiving a request for a process from a client device; classifying a plurality of tasks included in a first process according to a predetermined criterion and creating a plurality of second processes from the first process; processing the plurality of second processes at once by referring to data related to control and management of the energy management system; and transmitting results of the processing of the plurality of second processes to the client device.

According to embodiments of the present invention, it is possible to improve a structure of a data service module so that a service delay due to a load can be prevented.

Furthermore, by defining a process by service type or by role of a task, it is possible to show the performance optimized for the service in processing the process.

DETAILED DESCRIPTION

Hereinafter, embodiments of the present invention will be described in detail in junction with the accompanying drawings. It should be understood that the present invention is not limited to the following embodiments, and that the embodiments are provided for illustrative purposes only. The present invention is not intended to exclude regressive inventions in which other elements are added, altered, deleted, etc. The present invention encompasses other different embodiments which fall within the spirit and scope of the invention.

Although the present invention is described with general terms which are currently being in wide use, terms arbitrarily selected by the applicant may be used for particular cases. In these cases, the meanings of the terms are described in relevant portions of the detailed description of the invention. Therefore, the present invention should be construed with the meaning of the terms, not just the name of the terms. In the following description, the term 'include(s)' is not intended to exclude other elements or steps which are not enumerated in the description.

Figure 2:
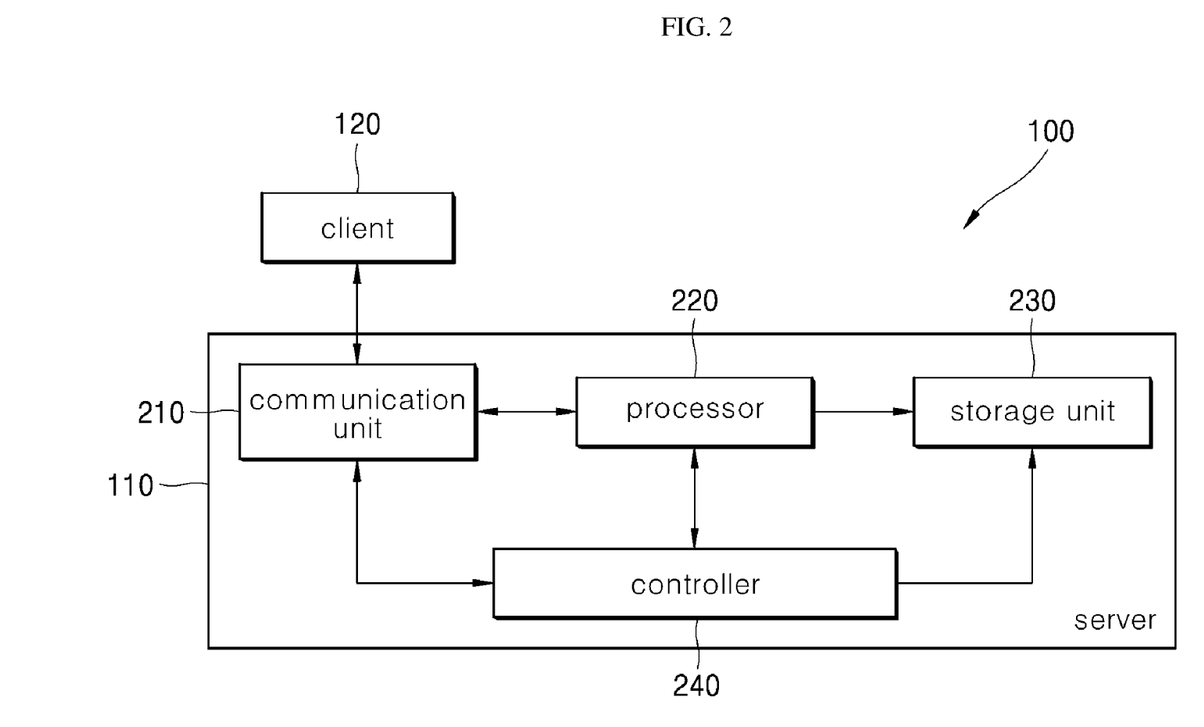
FIG. 2 is a block diagram illustrating the configuration of a server according to one embodiment of the present invention.

FIG. 2 is a block diagram illustrating the configuration of a server according to one embodiment of the present invention.

Referring to FIG. 2, a server 110 included in an energy management system 100 may process a request from a client 120 and perform the overall control of the energy management system 100.

In one embodiment, the server 110 may include a communication unit 210, a processor 220, a storage unit 230 and a controller 240.

The communication unit 210 may communicate with the client 120.

In this case, the client 120 may be included in the energy management system 100. However, the present invention is not limited thereto. For example, the client 120 may be included in a system other than the energy management system 100 or may be located outside the energy management system 100.

Schemes of communication of the communication unit 210 with the client 120 may include various forms of wired/wireless communication schemes. Specifically, the communication unit 210 and the client 120 may be interconnected by a cable, a transmission line, a power line or a local area network (LAN) to conduct wired communication or may be interconnected by wireless to conduct wireless communication such as radio LAN communication, mobile communication, data communication and the like.

The communication unit 210 may conduct the communication with the client 120 to receive a request for a process from the client 120 or transmit a result of the process performed by the server 110 in response to the received request to the client 120.

In the specification, the client 120 may be used with the same meaning as a client device. Hereinafter, the client 120 and the client device may be exchangeable.

A "process" used herein may refer to an operation or process for data input/output, a program being executed, or an operation or procedure of performing a task.

The process may include a parent process as an upper layer, and a child process as a lower layer. The parent process begins according to a program or instruction and the child process is created by the parent process. In this case, one parent process forks and manages a plurality of child processes. When the parent process creates the plurality of child processes, task processing by multi-process become possible. In addition, a child process may recreate its child process (i.e., a grandchild process) in a next lower layer.

The processor 220 may execute the process requested by the client 120.

To this end, the processor 220 may include a plurality of central processing units (CPUs), each of which can interpret and operate an instruction received in association with the process and output a result of the operation. In this case, one CPU processes one process. Therefore, assuming that the processor 220 includes N CPUs, the processor 220 can process the maximum of N processes.

The processor 220 can process a plurality of processes at once.

Here, the plurality of processes may be child processes created by the controller 240, which will be described below. Specifically, when a process requested by the client 120 includes a plurality of tasks, the controller 240 classifies the plurality of tasks according to a predetermined criterion. Thereafter, the controller 240 creates a plurality of child processes from the process requested by the client 120. In this case, the processor 220 can multi-process the plurality of child processes created by the controller 240.

In another embodiment, the processor 220 can process the plurality of processes sequentially or at different times rather than simultaneously.

In processing the plurality of child processes, the processor 220 may refer to real-time data associated with the energy management system 100 and stored in the storage unit 230.

The storage unit 230 may store the real-time data associated with the energy management system 100. Specifically, the real-time data associated with the energy management system 100 may include all data associated with control and management of the energy management system 100, such as a voltage, a current and so on.

In one embodiment, the storage unit 230 may be a real-time database (RTDB). The RTDB collects, stores and manages, in real time, data of processes performed by a variety of sub-systems included in the energy management system 100. The RTDB can be used as a means for decision-making required for power system analysis and system operation.

To this end, the storage unit 230 may be implemented with at least one of storage media including RAM (Random Access Memory), SRAM (Static RAM), ROM (Read-Only Memory), EEPROM (Electrically Erasable Programmable ROM), PROM (Programmable ROM) and a magnetic memory.

When the process includes the plurality of tasks, the controller 240 can create a plurality of child processes from the process by classifying the plurality of tasks according to a predetermined criterion.

Each of the plurality of tasks included in the process may be referred to as a "thread" or "worker." A thread used herein refers to a task unit of a program or an operating system. One process may include a plurality of threads.

In this embodiment, the reason for creating the plurality of child processes from the process is to increase a throughput by multi-processing the plurality of child processes. One CPU processes one process. For example, even when one process includes 100 threads, this process can be processed only by one CPU. Specifically, only threads as many as cores of the CPU can be executed at the same point of time. If there are 10 CPUs, each of which has 8 cores, and one process includes 100 threads, 8 threads are executed at the same point of time.

However, rather than one process including 100 threads, for example, if there are 10 processes, each of which includes 10 threads, since the 10 processes can be executed by the respective 10 CPUs at once although the total number of threads is 100 as in the earlier-mentioned example, the number of threads executed (processed) at the same point of time is 80.

Accordingly, the controller 240 can cause the processor 220 to execute the plurality of child processes at once, which is created from one parent process.

In one embodiment, when the processor 220 includes a plurality of CPUs, the controller 240 may allocate the plurality of CPUs to the plurality of child processes, respectively. Since one CPU processes one process, the number of child processes created cannot be larger than the number of CPUs. Accordingly, in this case, the number of child processes may be equal to or smaller than the number of CPUs, which will be described in more detail later with reference to FIGS. 5 and 6.

Furthermore, if a load is weighted on the child processes which perform predetermined tasks, the controller 240 can additionally create a new child process which can perform the predetermined task.

The predetermined criterion according to which the plurality of tasks included in one process is classified may include one of the kind of a service offered by a task and the role of a task. The kind of a service offered by a task may include a database-related service, a control-related service, a file-related service, etc. The role of a task may include data request, control instruction, file creation and loading, database value storage, etc.

After the plurality of child processes is created from the process, the controller 240 can control the processor 220 to process the plurality of child processes at once by referring to the real-time data.

In this case, after the processor 220 processes the plurality of child processes, the controller 240 can control the communication unit 210 to transmit a result of the processing to the client 120.

Figure 3:
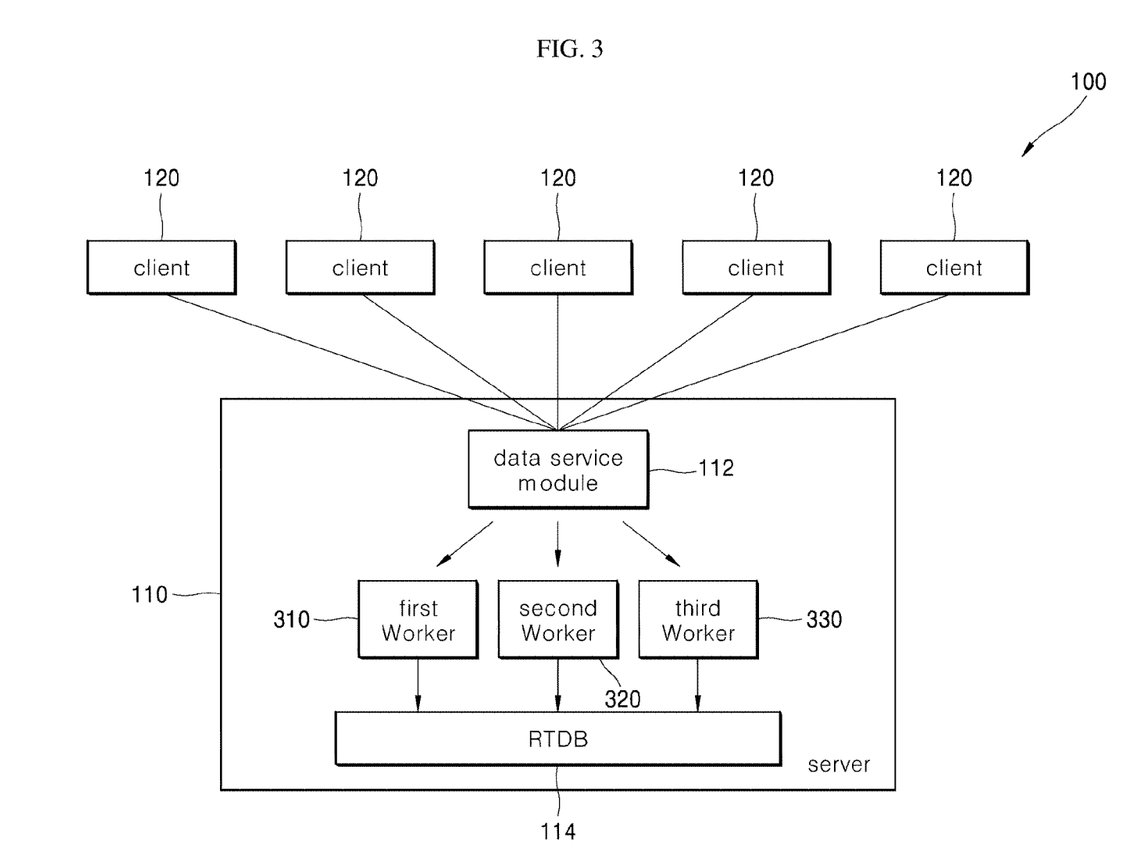
FIG. 3 is a diagram used to explain a procedure of processing a process in an energy management system according to one embodiment of the present invention.

FIG. 3 is a diagram used to explain a procedure of processing a process in the energy management system according to one embodiment of the present invention.

As illustrated in FIG. 3, according to one embodiment of the present invention, a process performed by one data service module 112 in the existing server 110 may be performed by a plurality of workers 310, 320 and 330. In this example, the data service module 112 performs only creation and management of the plurality of workers 310, 320 and 330 and load balancing for a data service through service request distribution but processes no process. The process is processed by the plurality of workers 310, 320 and 330. The plurality of workers 310, 320 and 330 may correspond to the child processes created by the data service module 112.

Referring to FIG. 3, the server 110 may include the data service module 112, a real-time database (RTDB) 114, a first worker 310, a second worker 320 and a third worker 330. Here, the first worker 310, the second worker 320 and the third worker 330 correspond to the child processes created from the process requested by the client 120.

The server 110 can process the process requested from the client 120 and transmit a result of the processing to the client 120.

Specifically, when the energy management system 100 is operated, the data service module 112 creates and executes the workers 310, 320 and 330 as child processes one by one according to a predefined role.

The workers 310, 320 and 330 executed by the data service module 112 classify, arrange and complement tasks, which have been performed by the existing data service module 112, by respective roles.

To this end, the data service module 112 may classify data request, control instruction, file creation and loading, database value storage, etc., by the respective roles, and allocate the roles to the workers 310, 320 and 330, respectively. For example, upon receiving an instruction related to database value storage, a database-related worker stores the database value after verifying the validity for the database value storage. As another example, upon receiving a field equipment control instruction, a control-related worker verifies the validity for the field equipment control instruction and then transmits a control signal to the field equipment.

Thereafter, upon receiving a request for a process from the client 120, the data service module 112 transmits the request to the workers 310, 320 and 330. The workers 310, 320 and 330 execute tasks, such as data request, control instruction, file creation and loading, database value storage, etc., received from the data service module 112, and transmit results of the execution to the data service module 112.

The data service module 112 transmits the results received from the workers 310, 320 and 330 to the client 120 requesting a service.

In this embodiment, upon receiving a request for a service or a process, the data service module 112 plays only a role of distributing the received request to the workers 310, 320 and 330 and managing the workers 310, 320 and 330, while an actual task for the request is performed by the workers 310, 320 and 330. Therefore, the data service module 112 can eliminate a load which occurs due to service processing which occupies the highest percentage of load, thereby preventing the whole data service from being delayed with increase in load.

In addition, if the workers 310, 320 and 330 are increased to be as many as the CPUs, a throughput is increased in response to the maximum number of CPUs as compared to the existing structure where only one CPU can be used.

Furthermore, by defining the roles of the workers 310, 320 and 330 by service type, the workers 310, 320 and 330 can show the performance optimized for the service.

Figure 4:
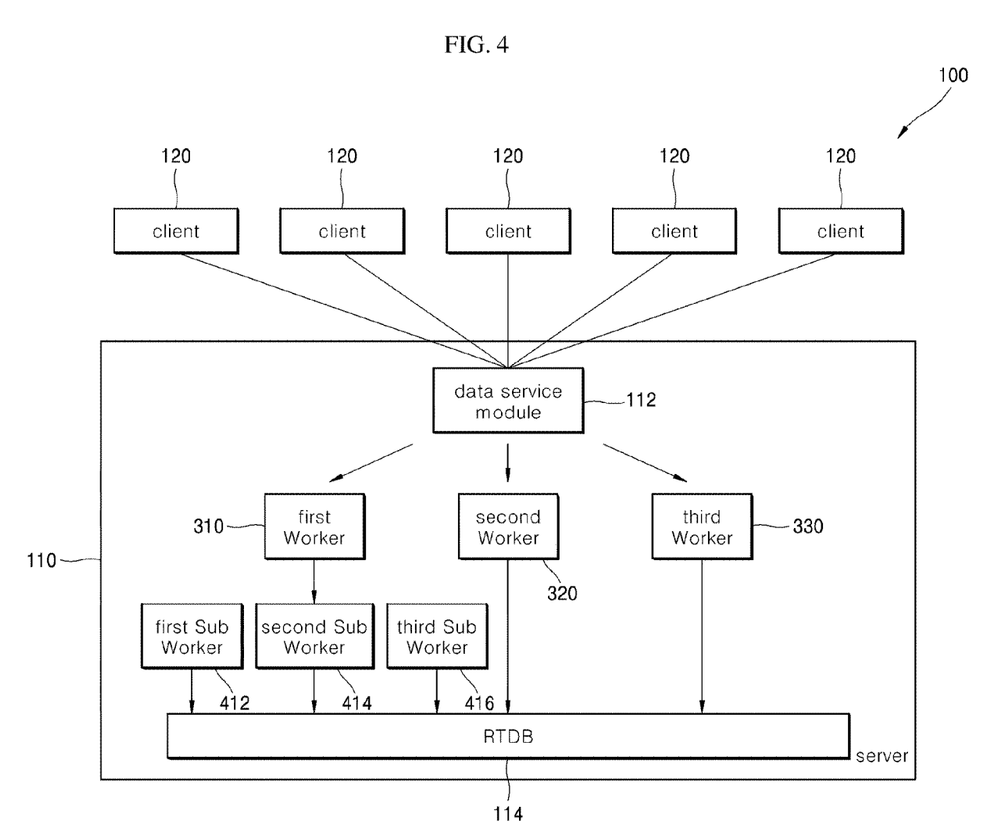
FIG. 4 is a diagram used to explain a procedure of processing a process in an energy management system according to one embodiment of the present invention.

FIG. 4 is a diagram used to explain a procedure of processing a process in the energy management system according to one embodiment of the present invention.

According to this embodiment, when a plurality of child processes is created from a parent process, it may be possible to again create a plurality of grandchild processes from each of the plurality of child processes. Specifically, as illustrated in FIG. 4, the data service module 112 of the server 110 can create a plurality of grandchild processes 412, 414 and 416 from a child process 310 to perform a hierarchical process.

In FIG. 4, a first worker 310, a second worker 320 and a third worker 330 correspond to the child processes created by the data service module 112.

A first sub worker 412, a second sub worker 414 and a third sub worker 416 correspond to the grandchild processes created by the first worker 310.

In this case, the created processes 310, 320 and 330 or grandchild processes 412, 414 and 416 disappear when they play their own roles no longer. Specifically, the parent process created the child processes 310, 320 and 330 may stop the child processes 310, 320 and 330, or the child processes 310, 320 and 330 or the grandchild processes 412, 414 and 416 may be terminated for themselves.

The energy management system of FIG. 4 has the same configuration as that of FIG. 3 except that the grandchild processes 412, 414 and 416 are again created from the child process 310 and, therefore, explanation of which will not repeated for the sake of brevity.

Figure 5:
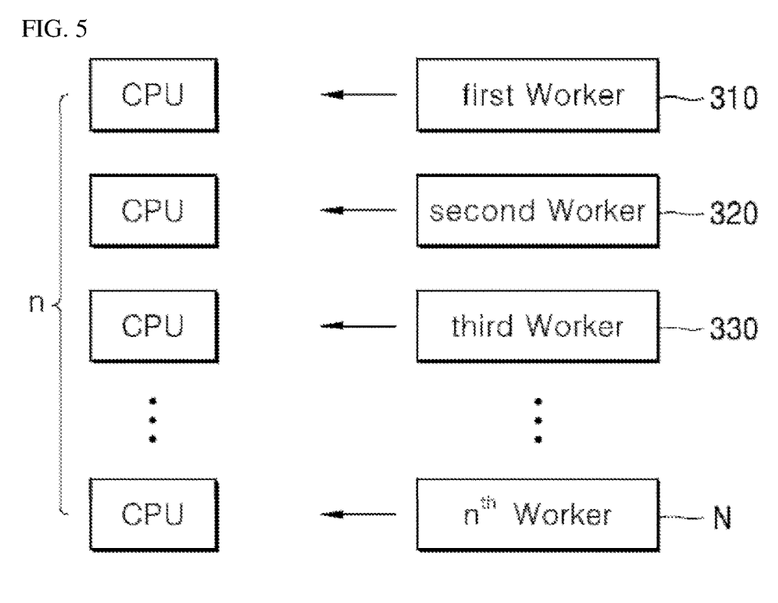
FIG. 5 is a diagram used to explain a procedure of allocating CPUs to a plurality of child processes, respectively, according to one embodiment of the present invention.
Figure 6:
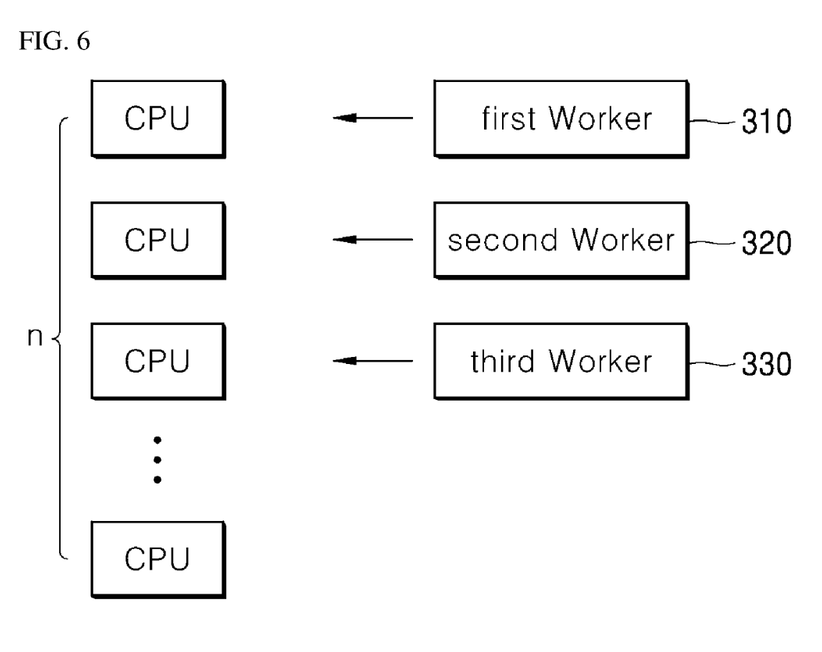
FIG. 6 is a diagram used to explain another procedure of allocating CPUs to a plurality of child processes, respectively, according to one embodiment of the present invention.

FIG. 5 is a diagram used to explain a procedure of allocating CPUs to a plurality of child processes, respectively, according to one embodiment of the present invention. FIG. 6 is a diagram used to explain another procedure of allocating CPUs to a plurality of child processes, respectively, according to one embodiment of the present invention.

As illustrated in FIG. 5, a plurality of CPUs is allocated to a plurality of workers 310, 320, 330, . . . , N, respectively. In this case, the plurality of workers 310, 320, 330, . . . , N can be processed at once in parallel by their respective corresponding CPUs. The number of created workers 310, 320, 330, . . . , N cannot be larger than the number of CPUs. That is, the number of created workers 310, 320, 330, . . . , N has to be equal to or smaller than the number of CPUs. It is shown in FIG. 5 that n workers 310, 320, 330, . . . , N are created to correspond to n CPUs.

It is illustrated in FIG. 6 that a plurality of workers 310, 320 and 320 is created in a sequential manner. If a load is weighted on a second worker 320 performing a particular task, the data service module 112 can additionally create another second worker 320 performing the same task. Thereafter, upon receiving a request for the task from the client 120, the data service module 112 distributes the task to the most ideal one of the workers performing the task.

As illustrated in FIG. 6, by adjusting the number of workers 310 and 320 depending on a load in a way of flexibly adding and executing the workers 310 and 320, it is possible to increase a throughput as much as the number of CPUs.

Figure 7:
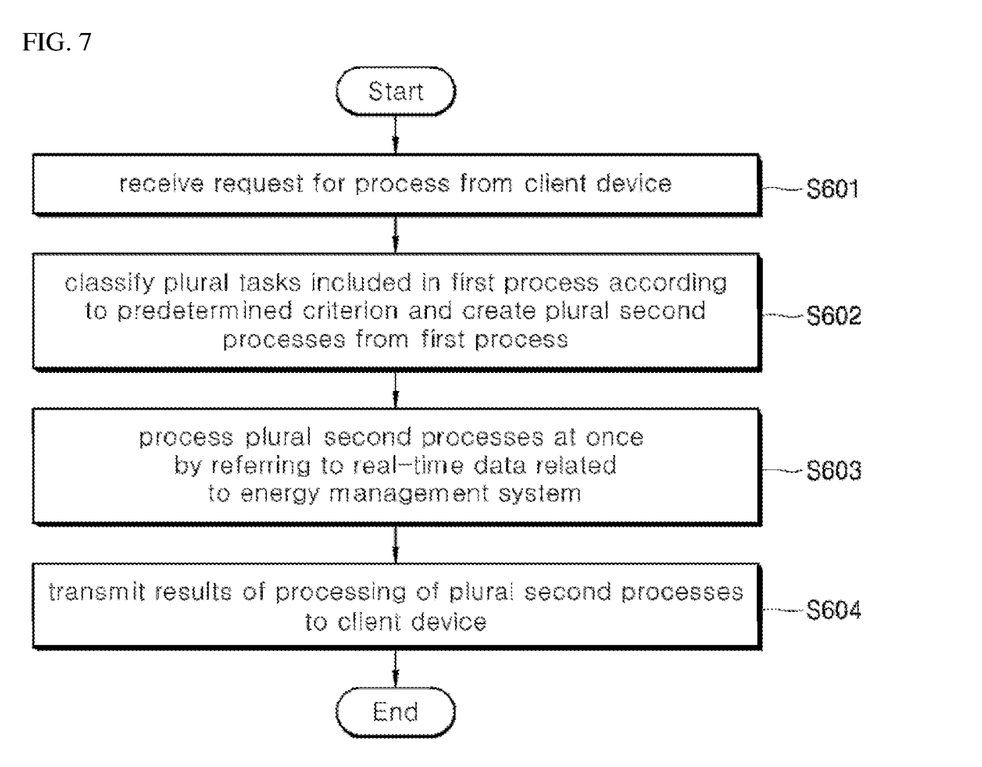
FIG. 7 is a flow chart illustrating a procedure of operation of the server according to one embodiment of the present invention.

FIG. 7 is a flow chart illustrating a procedure of operation of the server according to one embodiment of the present invention.

Referring to FIG. 7, first, the server 110 receives a request for a process from the client device 120 (S601).

If the process is a first process including a plurality of tasks, the server 110 classifies the plurality of tasks according to a predetermined criterion and creates a plurality of second processes from the first process (S602).

Here, the predetermined criterion may include one of the kind of a service offered by a task and the role of a task. The kind of a service offered by a task may include a database-related service, a control-related service, a file-related service, etc. The role of a task may include data request, control instruction, file creation and loading, database value storage, etc.

The first process may be a parent process and the plurality of second processes may be child processes.

The server 110 processes the plurality of second processes at once by referring to real-time data related to the energy management system 100 (S603).

The server 110 transmits results of the processing of the plurality of second processes to the client device 120 (S604).

In conclusion, according to the above embodiments of the present invention, it is possible to improve a structure of a data service module so that a service delay due to a load can be prevented.

Furthermore, by defining a process by service type or by role of a task, it is possible to show the performance optimized for the service in processing the process.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An energy management system comprising:
   a client device; and
   a server including:
      a communication unit configured to communicate with the client device;
      a storage unit configured to store data related to control and management of the energy management system; and
      a controller configured to:
         classify a plurality of tasks included in a first process according to a predetermined criterion;
         create a plurality of second processes from the first process; and
         provide the plurality of second processes to a processor when the first process requested by the client includes the plurality of tasks; and
      wherein the processor is configured to:
         process the first process requested by the client device when the first process does not include the plurality of tasks; and
         process the plurality of second processes provided by the controller by referring to the data when the first process includes the plurality of tasks;
      wherein, if a load is weighted on a second process performing a predetermined task, the controller is further configured to control the processor to additionally create another second process performing the predetermined task.

2. The energy management system according to claim 1, wherein the processor includes a plurality of CPUs and the controller allocates the plurality of CPUs to the plurality of second processes, respectively.

3. The energy management system according to claim 2, wherein the number of second processes is equal to or smaller than the number of CPUs.

4. The energy management system according to claim 1, wherein the first process is a parent process and the second processes are child processes of the parent process.

5. The energy management system according to claim 1, wherein the predetermined criterion includes one of a kind of a service offered by the task and a role of the task.

6. The energy management system according to claim 5, wherein the kind of a service offered by the task includes a database-related service, a control-related service, and a file-related service.

7. The energy management system according to claim 5, wherein the role of the task includes one of a data request role, a control instruction role, a file creation and loading role, and a database value storage role.

8. The energy management system according to claim 1, wherein the controller is further configured to control the communication unit to transmit results of the processing of the plurality of second processes to the client device.

* * * * *